United States Patent [19]

Friel, Jr. et al.

[11] Patent Number: 4,871,483
[45] Date of Patent: Oct. 3, 1989

[54] NOVEL NON-DEPOSITING DEFOAMING COMPOSITIONS

[75] Inventors: Thomas C. Friel, Jr., Winder; Anthony J. O'Lenick, Lilburn, both of Ga.

[73] Assignee: GAF Corporation, Wayne, N.J.

[21] Appl. No.: 39,306

[22] Filed: Apr. 16, 1987

[51] Int. Cl.$^4$ ............................................... C09F 5/00
[52] U.S. Cl. ...................................................... 260/404.5
[58] Field of Search .............................. 252/358, 321; 260/404.5

[56] References Cited

U.S. PATENT DOCUMENTS

| | | |
|---|---|---|
| 2,545,677 | 5/1950 | Sperry . |
| 2,563,856 | 10/1951 | McGinn . |
| 2,715,614 | 8/1955 | Snook . |
| 2,723,959 | 11/1955 | Jacoby . |
| 2,868,734 | 1/1959 | De Castro . |
| 2,903,432 | 9/1959 | Hwa . |
| 2,923,687 | 2/1960 | Jursch . |
| 3,180,786 | 4/1965 | Domba . |
| 3,180,836 | 4/1965 | Jursich . |
| 3,198,744 | 8/1965 | Lamont . |
| 3,207,698 | 9/1965 | Liebling . |
| 3,215,635 | 11/1965 | Liebling . |
| 3,235,509 | 2/1966 | Nitzsche . |
| 3,408,306 | 10/1968 | Boylan . |
| 3,501,373 | 3/1970 | Illingworth . |
| 3,573,222 | 0/1972 | Harrison . |
| 3,652,453 | 3/1972 | MacDonnell . |
| 3,661,793 | 5/1972 | Curtis . |
| 3,673,105 | 6/1972 | Curtis . |
| 3,679,589 | 7/1972 | Schnegelberger . |
| 3,697,438 | 10/1972 | Lieberman . |
| 3,705,860 | 12/1972 | Duvall . |
| 3,723,342 | 3/1973 | Shane . |
| 3,751,373 | 8/1973 | Lieberman . |
| 3,923,683 | 12/1975 | Michalski et al. . |
| 3,928,250 | 12/1975 | Kosswig . |
| 3,932,206 | 1/1976 | Illingworth et al. . |
| 3,935,121 | 1/1976 | Lieberman et al. . |
| 3,951,853 | 4/1976 | Suwala . |
| 4,008,173 | 2/1977 | Devis . |
| 4,009,119 | 2/1977 | Poschmann et al. . |
| 4,021,365 | 5/1977 | Sinka et al. . |
| 4,032,473 | 6/1977 | Berg . |
| 4,039,469 | 8/1977 | Raleigh . |
| 4,062,820 | 12/1977 | Mitchell, III et al. ........... 260/404.5 |
| 4,070,298 | 1/1978 | Scardera . |
| 4,082,691 | 4/1978 | Berger . |
| 4,107,061 | 8/1978 | Sturwold et al. ................. 260/404.5 |
| 4,107,073 | 8/1978 | Maciaszek . |
| 4,225,456 | 9/1980 | Schmidt et al. . |
| 4,353,834 | 10/1982 | Langdon ........................... 260/404.5 |
| 4,599,189 | 7/1986 | Wahrmann et al. . |

Primary Examiner—Josephine Barr
Attorney, Agent, or Firm—Marilyn J. Maue; Joshua J. Ward

[57] ABSTRACT

The present invention involves new anti-foam compositions which control foaming in aqueous systems and by nature of their unique cloud point characteristics are insoluble and particulate above their inverse cloud point, and soluble below it. This property makes them non-depositing defoamers. As the defoamed aqueous system cools down these novel products become soluble, preventing insoluble material (pitch) from depositing on process equipment and matter being processed.

8 Claims, No Drawings

NOVEL NON-DEPOSITING DEFOAMING COMPOSITIONS

BACKGROUND

Many industrial processes utilize aqueous solutions and suspensions in which foam production is detrimental to the efficient conduct of the process. Traditional defoaming agents which are commonly employed control foam during these processes but may lead to insoluble material deposition upon process equipment, requiring costly and inconvenient clean up and down time. Eamples of processing in which foam is detrimental, and insoluble material deposition is commonly found includes, but is not limited to, paper manufacturing, paper de-inking, textile processing and sewage disposal systems. The insoluble material used for de-foaming may actually deposite upon the surface of the substrate being processed. If this occurs, the substrate will be of inferior quality and may have to be reprocessed to remove insoluble material.

In the paper industry the Kraft process is one of the most frequently used alkaline pulping processes. It is valuable in that spent chemicals may be recycled and reused thus decreasing processing costs. A large disadvantage of this process is the occurrence of foam during the pulp screening and washing procedures.

The Kraft process as taught in U.S. Pat. No. 3,215,635 to Liebling is generally described as being performed by first cooking the wood chips in digesters and then drawing off the spent chemicals for reuse. The resulting pulp fibers are then washed free in brown stock washers of a large amount of residual chemicals. These washers are a series of vats usually three or four in number which alternatively dilute the pulp with water and thicken it by picking it up on large rotary screens. From the brown stock washers, the pulp travels to the screen room where it is again diluted with water and put through vibrating screens which accept the now completely delignified fibers and reject the clumps of unpulped fibers, knots and other foreign material. Foam problems are severe in the screen room since the diluted pulp is subjected to violent agitation by the screens. The water removed from the pulp after the screening operations is referred to as the dilute black liquor and, for the sake of economy, is normally used as the dilution water for the third and fourth stage of the brown stock washers. The dilute black liquor is a foaming material, containing from about 0.001% to 0.1% by weight of solids and has a pH of about 12. The foaming of the dilute black liquor increases with the increase of the resin content of the wood used in this process.

Defoamers are generally used in most alkaline pulp mills during the screening operations so that a more efficient screening is accomplished and to prevent the pulp thickeners, utilized after the screening operations, from becoming clogged with entrapped air. When water dispersible defoamers are used during the screening operation, the control of foam and entrained air in the screening operation contributes to the washing efficiency of the pulp during the alkaline pulping process. This is accomplished by the fact that the screening efficiency of the pulp is increased, allowing ease of flow of the pulp throughout the thickeners and subsequent washers.

Additionally the paper de-inking process uses detergents which can cause considerable undesired foam when performing the desired removal of ink. More detailed descriptions of such processes are found in standard textbooks, such as A. M. Schwartz and J. W. Perry "Surface Active Agents", Vol. I (1949); and "Surface Active Agents and Detergents" Vol. II (1958). Interscience Publishers, New York, the descriptions of which are incorporated herein by reference.

The de-inking agents are used in solution in substantially aqueous media. The temperature of the de-inking solution may vary anywhere from room temperature, e.g., 40°–70° F. (4°–20 ° C.), up to about 200° F. (95° C.). Best results are achieved with the de-inking solutions described herein when they are alkaline in pH. It therefore is desirable that an alkali be included therein. Although any suitable alkali or alkaline earth metal hydroxide or salt may be employed, the alkali metal hydroxides and salts, such as sodium hydroxide potassium hydroxide, soda ash and the like are preferred. Enough of the alkali should be added to maintain the pH of the de-inking solution between about 7.0 and 11.5, or even higher, and preferably at least 7.1.

In preparing the de-inking solution, water is charged to the reactor or pulper and about 0.3 to 3 percent, based on the weight of the paper, of the de-inking agent described hereinabove is added. The de-inking agent is preferably added to the water prior to the addition of the wastepaper or waste.

To the resulting solution is added the printed paper, scrap or waste. The printed cellulosic charge may, if desired, be shredded by appropriate means prior to treatment. This, however, is not necessary, and the waste material may be added to the treating solution without shredding or without any subdivision in size whatsoever. It is one of the advantages of this invention that costly shredding or pulping techniques prior to de-inking need not be employed. Thus, the waste material to be de-inked is preferably added to the testing solution in its naturally dry condition, i.e., without being subjected to moisture or water other than that which is normally present in the atmosphere. Although de-inking will occur if the waste material is first slurred or pulped in water, in general it has been found that the results achieved are inferior to those obtained when the waste material is added to the treating solution in its naturally dry condition, i.e., in equilibrium with its natural atmospheric environment. Although not wanting to be restricted to this interpretation, it appears that wetting the waste material with water prior to subjecting it to the chemical treatment described herein has a tendency to set the ink and make it more difficult to remove from the cellulosic fibers. The amount of the scrap or waste added to the treating solution should be controlled. In general, the per cent of cellulosic by weight of the aqueous de-inking solution should be below 10 per cent and preferably below 6.0 per cent, or between about 4.0 and 6.0 percent. Good results are obtained when the de-inking solution contains about 5 to 5.5 per cent lb. weight of paper and this value appears to be optimum. The scrap is retained in the treating solution until substantial defiberization and separation of the ink takes place.

Following treatment, the defibered material is dropped to a chest or other reservoir, after which it is diluted with water to a solids content of between about 0.5 and 1.5 percent, preferably about 1.0 percent, based upon the solution weight.

Following dilution, the pulp is separated from the solution and washed and thickened by well known methods. Optionally, the pulp is then acidified to a pH of between about 4 and 6.5, preferably between about 4.5 to 5.5, thickened and then formed into a web.

This acidification step has been found to significantly increase the brightness of the paper produced from the recovered pulp, and also avoids the necessity of bleaching the pulp.

The recovered stock may be blended with fresh virgin sulfate or sulfite stock, or with additional recovered stock to make cellulosic articles, such as newspaper and so forth.

In the de-inking process undesirable foam is encountered most commonly when high temperature and high agitation are experienced. It is also at this time that maximum detergency is needed to remove ink form the paper. Standard defoamers based upon ethylene bis-stearamide, silicon oils, or mineral oils while effective at the high temperatures and agitation conditions, become insoluble at lower temperatures and deposite on process equipment causing what is commonly referred to as pitch. Products of this invention have the defoaming properties of ethylene bis-stearamide, silicone oils, or mineral oils, but become soluble below their inverse cloud point.

Defoamers for Textiles

Defoamers are employed in textile wet processing during scouring, desizing, bleaching and dyeing operations. The scouring, desizing and bleaching operations remove foreign materials such as warp size, processing oil, dirt and natural waxes from the fabric. This is done prior to dyeing in order to insure a well prepared substrate that will accept dye evenly. The processes employ surfactants for wetting and detergency that create foam. Foaming must be controlled in order to maintain proper liquor to goods ratio that insures adequate fabric preparation. Defoamers currently employed for these processes utilize emulsified silicone oil, mineral oils and emulsified bis-stearamide waxes in mineral oil. Although these type products are effective defoamers they have the problem of re-deposition of insoluble materials on the fabrics while they are being processed. If the insoluble materials are not removed prior to dyeing they may create resist spots in the fabrics where the dye does not penetrate or in the case of some synthetic fibers, oil spots where the fabric will actually dye darker in that spot. Defoamers formulated with compounds described by the invention will not have this problem. They will defoam during the higher temperature part of the process that employs the foaming surfactants and be subsequently rinsed out at a later stage in the process at lower temperatures. This will greatly reduce the possibility of resist spots and dark spots during the dyeing process and thus reduce second quality production and the redyeing of fabrics.

Dyeing processes also employ surfactants that foam as wetting agents and after scour agents to remove loose dye stuff. Foam must be controlled during the dyeing process with materials that do not redeposit on the fabrics. The invention also has application during the dyeing process where the actual dyeing will take place at a higher temperature employing the invention and then the goods will subsequently be rinsed clean at a lower temperature.

BACKGROUND OF THE INVENTION

There are several references to foam control agents in the literature. Most use (1) water insoluble components like mineral oil, ethylene bis-stearamide, etc., or (2) emulsifier like soaps, ethoxylated esters, polyethylene glycols esters, etc. There are numerous formulations in the literature. U.S. Patent 3,180,836 by Myron Jursich claims that alkoxylated castor oil can be used as an emulsifier in foam control fomulations. The material functions like standard nonionics in the degree of defoaming.

The following patents demonstrate relationship between aqueous and defoaming capability and are incorporated by reference:

| | | |
|---|---|---|
| 2,545,677 | Elmer H. Sperry | Microcrystalline Wax |
| 3,207,698 | Raymond Liebling | Defoaming Aqueous Systems |
| 3,215,635 | Raymond Liebling | Defoaming Compositions |
| 3,408,306 | Francis J. Baylar | Controlling Foaming |
| 3,673,105 | James H. Curtis | Aqueous Foam Control |
| 3,751,373 | Hillel Lieberman | Foam Control |
| 4,082,691 | Paul Daniel Berger | Organo Silicone/Silica |
| 4,107,073 | Joseph A. Macizsfek | Pulp & Paper Making Add |

Many standard formulations used as defoamers have water insoluble oils and other components which are emulsified by use of surface active agents. The following patents are examples and are incorporated by reference:

| | | |
|---|---|---|
| 2,563,856 | Earl McGinn | Pulp and Paper Stock Defoamer |
| 2,723,959 | Arthur Jacoby | Inhibiting Aqueous Foam |
| 2,715,614 | Clark Snook | Pulp and Paper Defoamer |
| 2,868,734 | Arthur De Castro | Liquid Defoaming Compositions |
| 2,923,687 | Myron Jursch | Defoaming Compositions and Use |
| 3,198,744 | William Lamont | Controlling Aqueous Foam |
| 3,652,453 | Thomas Mc Sonnel | Defoamer Composition |
| 3,705,860 | Jacque Duvall | Anti-foam Agent |

Invention

The invention relates to a product of a hydroxy containing acid which has been derivatized on the hydroxyl group with an oxiraine containing compound and derivatized at the carboxyl group with an amine. More specifically, the present invention makes use of an alkoxylated bis-amide which has higher molecular weight than ethylene bis-stearamide, and becomes completely insoluble and particulate above its cloud point. This insolubility gives the molecule its defoaming properties. Selection of the correct molecule for a given process temperature allows for application of these compounds over a wide operating temperature range, making these compounds applicable to many different industrial processes.

The compounds cited in the referenced patents defoam because an insoluble oil phase disrupts the foam at the foam /air/ water interface by replacement with an air/oil/ water interface.

The problem with the emulsified oil systems is that there are three essential parts of the formulation;
1 Water
2 An insoluble oil in wax present to defoam
3 An emulsifier or dispersant present to disperse the insoluble oil in wax During the process the formulation is added to initiate anti-foam action in the aqueous solution usually at elevated temperatures, then in a subsequent step the water is removed from the product being processed, i.e., fiber, textile material, sewage, etc.

With removal of water the emulsion breaks and the insoluble materials rain out causing "pitch". Pitch is the insoluble wax or oil that deposits on the equipment after the defoamer has worked and the water has been removed.

Considerable down time and increased expense are involved to clean up equipment. It is the object of the is invention to provide "defoaming" materials which can be used alone or in non depositing combination with other ingredients to defoam aqueous processes which are run at slightly elevated temperatures.

Compounds of the following structure have been found to defoam above their inverse cloud point by virtue of their insolubility and then become soluble upon cooling (Below their cloud point):

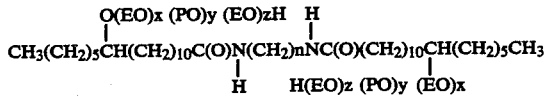

wherein;

EO is ethylene oxide

PO is propylene oxide n is an integer from 1 and 10 each x, y, and z are integers from 0 to 20 with the proviso that x+y+z is greater than 0 The inverse cloud point phenomena which occurs as one heats an aqueous solution to a critical temperature has been well documented. More detailed descriptions of this are found in standard textbooks, such as A. M. Schwartz and J. W. Perry "Surface Active Agents", Vol. I (1949); and "Surface Active Agents and Detergents" Vol. II (1958). Interscience Publishers, N.Y. the descriptions of which are incorporated herein by reference. Standard nonionics which exhibit this cloud point phenomena do not exhibit defoaming properties, and consequently are no effective in defoaming processes.

This invention teaches that alkoxylated castor oil and alkoxylated hydrogenated castor oil can be reacted with polyamines like ethylene diamine to give materials which defoam by virtue of their particulate nature above their cloud point yet are soluble below it.

GRAPH I
CLOUD POINT PHENOMENA
(% TRANSMISSION OF 0.1% MATERIAL IN WATER)

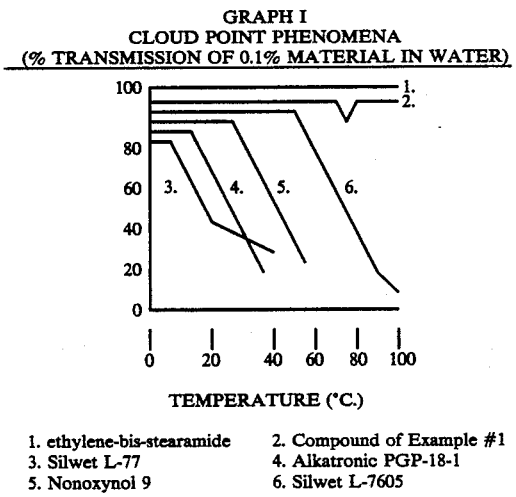

TEMPERATURE (°C.)

1. ethylene-bis-stearamide
2. Compound of Example #1
3. Silwet L-77
4. Alkatronic PGP-18-1
5. Nonoxynol 9
6. Silwet L-7605

The cloud point is defined as that temperature at which the test material becomes insoluble in water asa evidenced by a haze or insoluble material in the liquor.

The following explanations are appropriate to the understanding of Graph I ; theylene-bis-stearamide (1) is insoluble in water, floats on top and does not effect % transmittance. Silicones such as Union Carbide Silwet L-77 (3) and Silwet L7605 (6) exhibit cloud point phenomena, form emulsions which cloud the solution and inhibit % transmitted over a wide range of temperatures. Traditional commercial nonionics such as blocked polymers (Alkatronic PGP-18-1) (4) and ethoxylated alkyl phenols (nonoxynol 9) (5) are similar to the silwets in that emulsions form at cloud point which cloud the solution and decrease % transmittance. These materials do not as effectively defoam as do particulates like ethylene-bis-stearamide and compounds of the present invention. The subject of this invention demonstrated by alkoxylated bis-amides (2) has small brief effect upon % transmittance as cloud point is reached but immediately becomes insoluble in water, floats to the top where its antifoaming action occurs and is effectively removed from solution preventing any effect upon % transmittance. This alkoxylated bis-amide enjoys the positive effect of ethylene-bis-stearamide, insolubility, yet below its cloud yet below its cloud point has the advantage of solubility which ethylene-bis-stearamide does not exhibit.

The defoamer compositions of this invention are also useful in the reduction of existing foam (knockdown) and prevention of foam formation (hold-down) which occurs, for example, in brown stock washer liquor during the pulping process. When used for this purpose, from about 0.003 to about 0.5 parts by weight of defoamer solids are added to the pulp, per 100 parts by weight of dry pulp.

The following apparatus and test method from U.S. Patent #4,225,456 can be used to determine the effectiveness of various compositions in knocking down and holding down foam in brown stock washer liquor. The apparatus and method could, however, be used for testing any liquid which forms a foam upon agitation and/or heating.

A 1000 cc. tall form beaker is used as the primary container for the liquor to be tested. A curved glass outlet fused onto the base of the beaker is connected with a rubber hose to a centrifugal pump. The pump is used to circulate continuously the test liquid from the beaker into the pump and back into the beaker. Pumping is carried out at rate so that the test liquid in the beaker is agitated by the reentering test liquid to such an extent that foam forms. The pumping rate is about two gallons per minute. Test liquid enters the beaker at a point about 6 centimeters above the surface of the liquid in the beaker and strikes the surface of the liquid in the beaker at an angle of 90 degrees.

In carrying out the testing of the defoamer compositions, 500 cc. of freshly obtained concentrated brown stock washer liquor is charged at about 75 degrees C, into the beaker. This liquid, when quiescent, fills the beaker to a level of about 8.3 centimeters from the bottom. This level is marked and labeled the 0 line. In the test for hold-down, 0.1 cc. of defoamer composition is added to the 500 cc. of test liquid in the beaker. The pump and stop watch are stated simultaneously. Height of the foam above the 0 line is measured at 15 second intervals for the first minute, then at 30 second intervals, and recorded. In the test for knockdown, the liquor is agitated and heated prior to the addition of any defoamer composition. After a foam has built up to 8 centimeters, 0.1 cc. of the defoamer composition to be tested is added and the data is recorded.

Typical defoaming formulations used in the above method are shown in Table I. Test results are shown in Table II.

TABLE #1
DEFOAMING FORMULATIONS

| Ingredient | 1 | 2 | 3 | 4 | 5 | 6 | 7 |
|---|---|---|---|---|---|---|---|
| Paraffinic oil | | | | 29.0 | | | |
| Ethylene-bis-stearamide | | 2.5 | | | | 0.0 | |
| Polymetharylate in oil | 3.0 | 1.0 | 3.0 | 4.5 | 3.0 | 3.0 | 4.5 |
| Silicone Surfactant | 1.5 | | | 0.0 | | | |
| Butanol + 3 P.O. | — | — | 1.5 | — | — | — | — |
| Formaldehyde Sol. | | | | 0.1 | | | |
| Fumerate Copolymer | — | — | 2.0 | — | 1.5 | 1.5 | — |
| Paraffinic/Naphthenic oil | | | | 5.0 | | | |
| Hydrophobic silica in oil | | | | 8.0 | | | |
| Castor oil + 15 E.O. | | | | 1.0 | | | |
| Water | | | | QS | | | |
| Silicone oil | | | | 0.1 | | | |
| Compound Example #1 | | | | 0.0 | | 2.5 | 0.0 |
| Compound Example #2 | | | | 0.0 | | 0.0 | 2.5 |
| Total | | | | 100.00% | | | |

TABLE II
DEFOAMING FORMULATION HOLD DOWN EFFICACY TESTS
(GEORGIA BROWN STOCK)
(Dosage 100 microliter)

| Defoaming Formulation # | (foam level in mls at time intervals in seconds) | | | | | |
|---|---|---|---|---|---|---|
| | 30 | 60 | 90 | 120 | 150 | 180 |
| 1 | 5 | 10 | 18 | 20 | 28 | 30 |
| 2 | 18 | 35 | 55 | 70 | 80 | 85 |
| 3 | 5 | 10 | 18 | 23 | 30 | 35 |
| 4 | 5 | 10 | 15 | 20 | 28 | 30 |
| 5 | 5 | 10 | 13 | 20 | 20 | 20 |
| 6 | 5 | 10 | 10 | 15 | 15 | 15 |
| 7 | 5 | 10 | 15 | 20 | 28 | 30 |

Additionally, the compounds of this invention continue to defoam upon repeated agitation. Ethylene-bis-stearamide shows decrease in effectiveness upon re-testing. To demonstrate this formulations A,B,C, and D in Table III were tested by the cylinder shake foam test, then allowed to stand five minutes and then reshaken. This allowed for the evaluation of the effectiveness of the defoamer formulation after repeated challenge as would be the case in a commercial process.

TABLE III
CYLINDER SHAKE FOAM TEST FORMULATIONS

| Formula | % by weight | | | |
|---|---|---|---|---|
| | A | B | C | D |
| Ethylene-bis-stearmide | 5.0 | 0.0 | 0.0 | 2.5 |
| Acryloid polymer | | | 2.0 | |
| Silicone oil | | | 1.0 | |
| Mineral oil | | | QS | |
| Compound Example #1 | 0.0 | 5.0 | 0.0 | 2.5 |
| Compound Example #2 | 0.0 | 0.0 | 5.0 | 0.0 |
| Hydrophobic Silica | 0.0 | 0.0 | 0.0 | 2.5 |
| Total | 100.00% by weight | | | |

Cylinder shake foam test results conducted with formulas A,B,C, and D are as follows;
Formula A is the standard formulation against which all others are measured.
Formula B is better initially in defoaming properties and is much more effective after 5 retests.
Formula C is slightly less effective than Formualtion B, but is better then Formulation A.
Formula D has hydrophobic silica added to the formulation this increases initial knock down, but after 5 retests looses effectiveness.

These tests demonstrate that the compositions of this invention are effective defoamers compared to existing commercial defoamers.

The apparatus and method described above may also be used to evaluate the defoamer composition in any liquid which forms foam during agitation and/or heating.

Other aqueous systems which may be defoamed with these invert defoamer compositions include kraft screen room bleach plant applications, pulp and paper mill effluents, animal glues, other adhesives, latex, starches, other resinous systems, water base paints and the like.

GENERAL PROCEDURE FOR EXAMPLES

To a suitable vessel is added molten 500 grams of hydrogenated castor oil and 2.0 grams of potassium hydroxide under good agitation. The resulting solution is stripped under vacuum at 110 C for 20 minutes. The reaction is heated to 150–160 C and specified amount of ethylene oxide is added (EO #1) subsequently the specified amount of propylene oxide is added (PO). Then, the specified amount of ethylene oxide is added (EO #2). The product is stripped under vacuum. The reaction mass is cooled and the vacuum relieved with nitrogen. The specified amount of ethylene diamine (EDA) is then added slowly. The reaction is conducted at 200 C. After about 6 hours the residual alkalinity is below 15 mg KOH/gm.

EXAMPLES

| Compound Example | EO #1 | PO | EO #2 | EDA |
|---|---|---|---|---|
| | weight in grams | | | |
| 1 | 353 | 1240 | 353 | 80 |
| 2 | 353 | 155 | 0 | 80 |
| 3 | 353 | 1240 | 470 | 80 |
| 4 | 941 | 0 | 0 | 80 |
| 5 | 0 | 1240 | 353 | 80 |
| 6 | 353 | 1240 | 941 | 80 |
| 7 | 0 | 775 | 470 | 80 |
| 8 | 2070 | 0 | 0 | 80 |
| 9 | 1176 | 0 | 0 | 80 |
| 10 | 1764 | 155 | 0 | 80 |

What is claimed;
1. A compound coforming to the following structure;

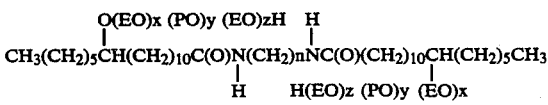

wherein;
EO is ethylene oxide

PO is propylene oxide n is an integer from 1 and 10
  each x, y, and z are integers from 0 to 20 with the proviso that the sum of x+y+z is greater than 0
2. The compound as claimed in claim 1 where;
EO is ethylene oxide
PO is propylene oxide
n is 2
each x is 3, each y is 8, each z is 4
3. The compound as claimed in claim 1 where;
EO is ethylene oxide
PO is propylene oxide
n is 2
each x is 0, each y is 5, each z is 4
4. The compound as claimed in claim 1 where;
EO is ethylene oxide
PO is propylene oxide
n is 2
each x is 8, each y is 0, each z is 0
5. The compound as claimed in claim 1 where;
EO is ethylene oxide
PO is propylene oxide
n is 3
each x is 10, each y is 0, each z is 0
6. The compound as claimed in claim 1 where;
EO is ethylene oxide
PO is propylene oxide
n is 2
each x is 15, each y is 1, each z is 0
7. The compound as claimed in claim 1 where;
EO is ethylene oxide
PO is propylene oxide
n is 2
each x is 0, each y is 5, each z is 0
8. The compound as claimed in claim 1 where;
EO is ethylene oxide
PO is propylene oxide
n is 4,
each x is 4, each y is 0, each z is 4

* * * * *